US009703768B1

(12) United States Patent
Graham et al.

(10) Patent No.: US 9,703,768 B1
(45) Date of Patent: Jul. 11, 2017

(54) OBJECT METADATA QUERY

(71) Applicant: EMC Corporation, Hopkinton, MA (US)

(72) Inventors: Stephen G. Graham, Chapel Hill, NC (US); Shashwat Srivastav, Seattle, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 317 days.

(21) Appl. No.: 14/501,891

(22) Filed: Sep. 30, 2014

(51) Int. Cl.
G06F 17/30 (2006.01)
G06F 17/27 (2006.01)

(52) U.S. Cl.
CPC .................. G06F 17/2705 (2013.01)

(58) Field of Classification Search
None
See application file for complete search history.

(56) References Cited

U.S. PATENT DOCUMENTS

2003/0172059 A1* 9/2003 Andrei .............. G06F 17/30454
2004/0098371 A1* 5/2004 Bayliss ............. G06F 17/30545
2009/0187573 A1* 7/2009 Johnston .................. G06F 8/10

OTHER PUBLICATIONS

EMC Corporation; "ViPR 2.1—Use the ViPR Object Services;" Jan. 2014; 10 Pages; http://www.emc.com/techpubs/vipr/ds_use_object_services-2.htm.
EMC Corporation; "ViPR 2.1—ViPR S3 Object Service API Support;" Jan. 2014; 8 Pages; http://www.emc.com/techpubs/vipr/ds_s3_supported_features-t.htm.
EMC Corporation; "ViPR EMC Atmos Object Service API Support;" Jan. 2014; 7 Pages; http://www.emc.com/techpubs/vipr/ds_atmos_supported_features-1.htm.
EMC Corporation; "ViPR 2.1—ViPR OpenStack Swift Object Service API Support;" Jan. 2014; 5 Pages; http://www.emc.com/techpubs/vipr/ds_swift_supported_features-2.htm.
EMC Corporation; "ViPR 2.1—Use S3 Applications with ViPR Object Storage;" Jan. 2014; 7 Pages; http://www.emc.com/techpubs/vipr/ds_use_s3_apps_with_vipr-2.htm.
EMC Corporation; "ViPR 2.1—Create Buckets to Support ViPR Data Services;" Jan. 2014; 11 Pages; http://www.emc.com/techpubs/vipr/ds_create_bucket-2.htm.
EMC Corporation; "Unleash the Valeue of Data with EMC ViPR Services;" Apr. 2014; 11 Pages.
Graham et al.; "Object Metadata Query;" U.S. Pat. App. Filed on Sep. 30, 2014; 33 Pages.
Hadoop Wiki, "Overview of Sequence File;" Downloaded on Feb. 16, 2015; 3 Pages; https://wiki.apache.org/hadoop/SequenceFile.
Hadoop Wiki, "HDFS Architecture Guide;" Downloaded on Jan. 26, 2015; 8 Pages; http://hadoop.apache.org/docs/r1.0.4/hdfs_design.html.

(Continued)

Primary Examiner — Syed Hasan
(74) Attorney, Agent, or Firm — Daly, Crowley, Mofford & Durkee, LLP

(57) ABSTRACT

An object storage system having object metadata query capability. Clients can pose queries to the object system in a high-level, declarative language. A query is evaluated against stored object metadata, and only objects satisfying the query's predicates are returned. The object storage system can evaluate alternative logical and physical query plans using a cost model. Queries can be posed using familiar REST-based APIs.

20 Claims, 6 Drawing Sheets

(56) References Cited

OTHER PUBLICATIONS

EMC Corporation, "What is ViPR HDFS?;" Downloaded Jan. 26, 2015; 6 Pages http://www.emc.com/techpubs/vipr/HDFS_overview-1.htm.

Graham et al., "Exposing Object Metadata to Distributed Processing Systems;" U.S. Appl. No. 14/674,314, filed Mar. 31, 2015; 44 Pages.

Graham et al., "Object Metadata Query With Distributed Processing Systems;" U.S. Appl. No. 14/674,324, filed Mar. 31, 2015; 44 Pages.

U.S. Non-Final Office Action dated Nov. 30, 2016 for U.S. Appl. No. 14/501,904; 15 Pages.

Response to U.S. Non-Final Office Action dated Nov. 30, 2016 for U.S. Appl. No. 14/501,904, Response filed Feb. 28, 2017; 8 Pages.

* cited by examiner

OBJECT METADATA QUERY

BACKGROUND

Currently available object storage systems include Amazon S3, Red Hat Ceph, Open Stack Swift, EMC's Atoms, and EMC's ViPR Object Data Service. Such systems may provide scale-out mechanisms for users to store and retrieve object data and associated metadata. These systems typically provide REST-based application programming interfaces (APIs) to insert, update, delete, and retrieve objects. In general, these systems do not provide query capabilities, making it difficult to build applications that query and retrieve objects therefrom. The current approach to solving this use case with object systems involves an application retrieving a superset of the desired objects and discarding those objects that do not meet the search criteria. This approach is resource intensive and inefficient for the object system's servers, the network, and the application.

SUMMARY

It is appreciated herein that it would be advantageous to provide a query mechanism within an object storage system itself, wherein clients can pose queries to the object system in a high-level, declarative language. A query is evaluated against stored object metadata, and only objects satisfying the query's predicates are returned.

Described herein is a system comprising an object store to store a plurality of objects and corresponding object metadata within storage devices, each of the objects having an object id and being associated with a bucket; a query parser to receive a query from a query source and to parse the received query into a query parse tree, the received query being associated with a bucket id; a query optimizer to generate candidate query plans, to evaluate the candidate query plans based upon a cost model, and to select one of the candidate query plans based upon the cost model evaluation, each of the candidate query plans being semantically equivalent to the received query; a query executor to retrieve ones of the object ids and the object metadata from the object store using the bucket id associated with the received query, to generate a stream of tuples from the retrieved object ids and the object metadata, to filter the stream of tuples according to predicates within the received query, and to project the stream of tuples according to a list of metadata keys within the received query to generate a query result set stream; and a query formatter to generate a response to the query source based upon the query result set stream.

In certain embodiments, the query optimizer generates at least one logical query plan according to the received query, and generates a plurality of physical query plans according to the logical query plan, wherein the selected query plan corresponds to one of the plurality of physical query plans. The query plan may comprise a tree representation, wherein nodes of the tree representation correspond to operations, wherein the query executor executes the selected query plan by traversing the nodes of the tree representation and executing the corresponding operations.

Also described herein is a method comprising receiving a query from a query source; parsing the received query into a query parse tree; generating candidate query plans, each of the candidate query plans being semantically equivalent to the received query; evaluating the candidate query plans based upon a cost model; selecting one of candidate query plans based upon the cost model evaluation; retrieving a plurality of object ids and corresponding object metadata from the object store using a bucket id associated with the received query; generating a stream of tuples from the retrieved object ids and object metadata; filtering the stream of tuples according to predicates within the received query; projecting the stream of tuples according to a list of metadata keys within the received query to generate a query result set stream; and generating a response to the query source based upon the query result set stream.

In some embodiments, the step of generating candidate query includes generating at least one logical query plans according to the received query, and generating a plurality of physical query plans according to the logical query plan, wherein the selected query plan corresponds to one of the plurality of physical query plans. The step of generating a plurality of physical query plans may include generating a tree representation, wherein nodes of the tree representation correspond to operations, the method further comprising traversing the nodes of the tree representation and executing the corresponding operations.

In various embodiments, the received query includes a select clause comprising the list of metadata keys, a where clause comprising the predicates, and/or an order clause comprising a sort criteria. The query executor can sort the stream of tuples according to the sort criteria.

In some embodiments, the received query is included within REST API request. In certain embodiments, the object store comprises a distributed key-value store to map object keys to storage locations within the storage devices.

BRIEF DESCRIPTION OF THE DRAWINGS

The concepts, structures, and techniques sought to be protected herein may be more fully understood from the following detailed description of the drawings, in which.

The drawings are not necessarily to scale, or inclusive of all elements of a system, emphasis instead generally being placed upon illustrating the concepts, structures, and techniques sought to be protected herein.

DETAILED DESCRIPTION

The phrases "computer," "computing system," "computing environment," "processing platform," "data memory and storage system," and "data memory and storage system environment" as used herein with respect to various embodiments are intended to be broadly construed, so as to encompass, for example, private or public cloud computing or storage systems, or parts thereof, as well as other types of systems comprising distributed virtual infrastructure and those not comprising virtual infrastructure. The terms "application," "program," "application program," and "computer application program" herein refer to any type of software application, including desktop applications, server applications, database applications, and mobile applications.

As used herein, the term "storage device" refers to any non-volatile memory (NVM) device, including hard disk drives (HDDs), flash devices (e.g., NAND flash devices), and next generation NNW devices, any of which can be accessed locally and/or remotely (e.g., via a storage attached network (SAN)). The term "storage device" can also refer to a storage array comprising one or more storage devices.

The term "memory" herein refers to any type of computer memory accessed by an application using memory access programming semantics, including, by way of example, dynamic random access memory (DRAM) and memory-mapped files. Typically, reads or writes to underlying devices is done by an operating system (OS), not the application. As used herein, the term "storage" refers to any resource that is accessed by the application via input/output (I/O) device semantics such as read and write systems calls. In certain instances, the same physical hardware device could be accessed by the application as either memory or as storage.

Figure 1:
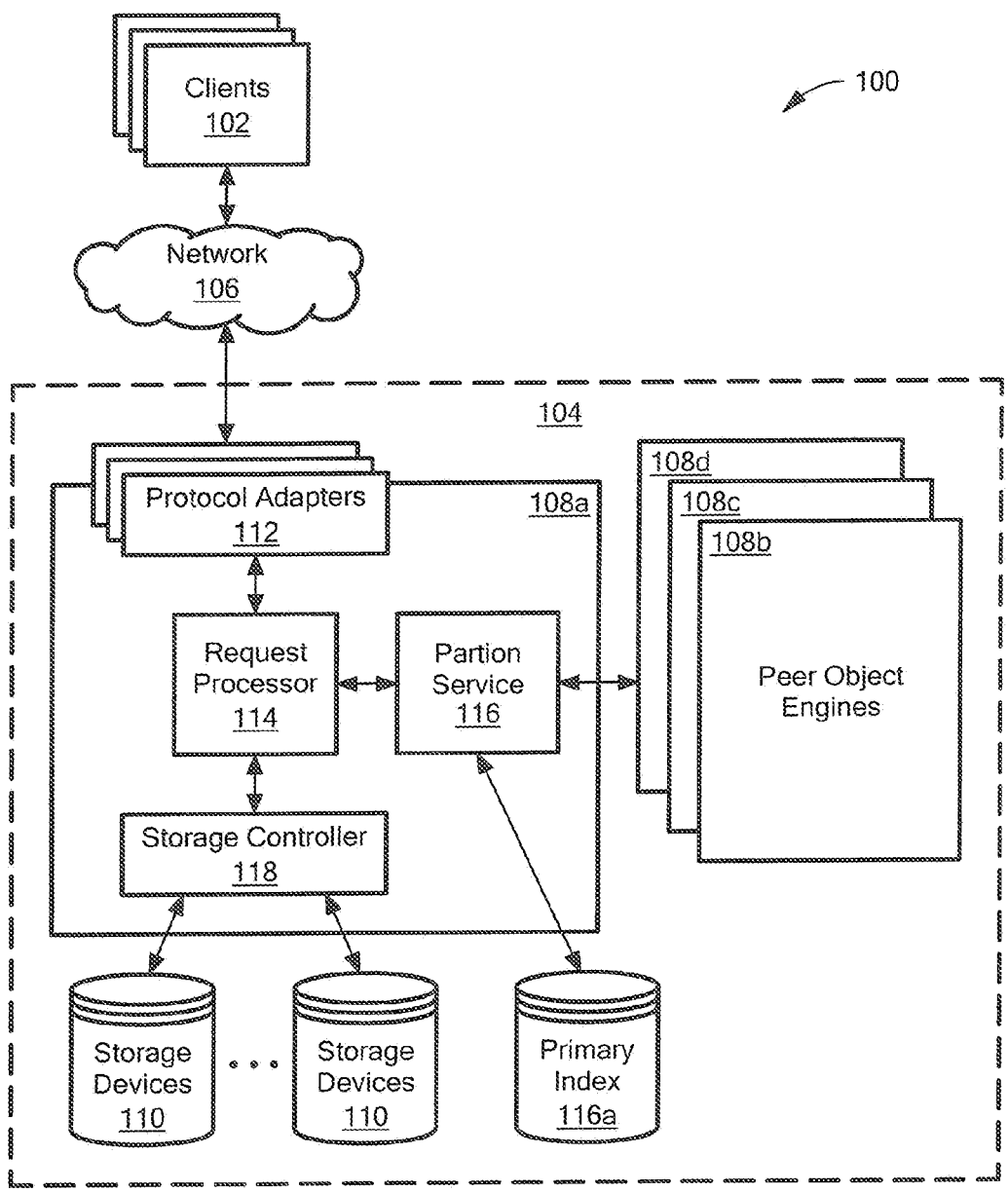
FIG. 1 is a block diagram of an illustrative storage environment having an object storage system.

Referring to FIG. 1, an illustrative storage environment 100 comprises clients 102 operatively coupled to an object storage system 104 via a network 106. The clients 102 may correspond to hosts and/or user applications configured to execute thereon. In some embodiments, a client 102 corresponds to a web browser, a command-line application, or another type of user application concerned with object storage. The network 106 may be any known communication network or combination of networks including networks using protocols such as, but not limited to, Ethernet, Internet Protocol (IP), Transmission Control Protocol (TCP), wireless protocols, etc.

The object storage system 104 includes one or more object storage engines (or simply "storage engines") 108, with four storage engines 108a-108d shown in this example. The object storage system 104 is capable of storing and retrieving object data and associated metadata. Objects can be uniquely identified within the system using an "object key" comprising one or more namespace identifiers and a unique "object id" within the identified namespace. In some embodiments, the namespace identifiers include a "tenant id" and a "bucket id," where the tenant id uniquely identifies a tenant (i.e., a customer, a user, or any other top-level entity) within the object storage system and the bucket id uniquely identifies a collection of objects (or "bucket") defined by and belonging to the tenant. The tenant, bucket, and object ids can be any suitable values, such as strings, numbers, or a combination thereof.

To scale processing and storage capabilities, the storage engines 108 can be distributed across multiple physical and/or virtual computing platforms, referred to herein as "data nodes" or more simply "nodes." In some embodiments, each storage engine 108 corresponds to a separate node. A storage engine 108 (or node) is responsible for managing a separate partition of object data, referred to as a "shard." Thus, object data may be read data in parallel from multiple storage devices and/or nodes, which can improve I/O performance. The storage engines 108 are operatively coupled to one or more storage devices 110. In some embodiments, different storage engines 108 are coupled to different storage devices 110. In certain embodiments, multiple storage devices 108 are coupled to a common storage device 110. Thus, a shard may correspond to a physical storage device and/or a logical storage device. The storage engines 108 can be interconnected using any suitable means, such as a local-area network (LAN) or a wide-area network (WAN). In certain embodiments, the nodes 108 communicate peer-peer over IPC using Google Protocol Buffers.

In various embodiments, the object storage system 104 includes a load balancer to receive requests from the clients 102, to select one of the storage engines 108 to process the request, and to forward the request thereto. Any suitable load balancing techniques may be used.

In general, each of the storage engines 108 is architecturally similar and, therefore, only one of the storage engines (i.e., storage engine 108a) is shown in detail in FIG. 1. The illustrative storage engine 108a includes one or more protocol adapters 112, a request processor 114, a partition service 116, and a storage controller 118, coupled as shown. The storage engine 108a supports one or more communication protocols ("protocols" for short) usable by the clients 102 to interact with the object storage system 104 (e.g., to read and write objects). The protocol adapters 112 include any suitable combination of hardware and software to implement these protocols. The illustrative storage engine 108a may comprise off-the shelf server hardware and/or software, e.g., a Windows server, a Sun Solaris server, an HP server, a Linux server, etc. In some embodiments, the storage engine 108 provides REST-based application programming interfaces (APIs) based on the S3 API from Amazon and/or the Swift API from OpenStack (thus, some of the protocol adapters 112 may correspond to REST-based APIs). It will be understood that these REST APIs generally provide at least the following commands: creating a bucket, retrieving, updating, and deleting a bucket by bucket id; retrieving a list of buckets; creating an object, retrieving, updating, and deleting an object by bucket and object id; and retrieving a listing of objects within a bucket by bucket id (sometimes referred to as a "list bucket operation"). In some embodiments, the create, retrieve, update, and delete operations are specified via an HTTP request method (e.g., "POST" would indicate a create whereas a "PUT" would indicate an update, GET indicates retrieval). Advantageously, existing object REST access protocols (e.g., S3 and Swift), which support scalable client access to object data, can be augmented to allow clients 102 to pose sophisticated queries over object metadata, as described further below in conjunction with FIG. 2.

In various embodiments, the object storage system 104 provides a programming language-based API by which command line tools or other user applications can interact with the object storage system 104.

The object storage system 104 shards object data and object data across multiple shards (i.e., partitions of storage devices 110 attached to nodes) and may store multiple replicas of object data/metadata to improve fault tolerance and data availability. The partition service 116 maintains a mapping between object keys and storage locations that contain portions of corresponding object data. The partition service 116 includes any suitable combination of hardware and software to maintain this mapping.

In various embodiments, the partition service 116 utilizes a distributed key-value store to store the mapping between object keys and storage locations. This key-value store is referred to herein as the "primary index" 116a. The primary index 116a may be stored on the same storage devices 110 as the object data, or may be stored separately. Those skilled in the art will understand that distributed key-value stores provide high performance, massive scalability, and fault-tolerance and typically do not impose a schema on the stored data. Any suitable key-value store can be used to maintain the primary index 116a, including commercial off-the-shelf (COTS) key-value stores such as Riak, MemcacheDB, or Voldmont. It will also be understood that such key-value stores may provide not only the ability to retrieve a value for a single key (referred to herein as a "GET" operation), but also the ability to retrieve key/value pairs for a range of a keys that match a given prefix (referred to herein as a "PREFIX-GET" operation).

As mentioned above, objects can be uniquely identified within the object storage system 104 from the combination of tenant id, bucket id, and object id. In a particular embodiment, the primary index 116a uses the key format "<tenant id>.<bucket id>.<object id>." Information about all objects within a bucket can be retrieved by issuing a PREFIX-GET operation on the primary index 116a using the prefix "<tenant id>.<bucket id>." This technique can be used to efficiently implement a "bucket scan" operation, as discussed below. It will be appreciated that other key formats, which may also allow for efficiently bucket scans, can be used.

The request processor 114 includes any suitable combination of hardware and software to process client requests. For requests that identify a particular object (e.g., an object read or write request), the request processor 114 can use the partition service 116 to determine if the request should be handled locally (i.e., if the entirety of the object's data is accessible by the current node) or if it must be delegated to another node 108. If the request can be handled locally, the request processor 114 issues read/write commands to the storage controller 118, which may be a storage-specific device driver (e.g., a Linux block device driver). Otherwise, the request is forwarded to one or more peer nodes 108b-108d storing the object data.

In various embodiments, the object storage system 104 is based on ViPR Object Data Services by EMC Corporation, a massively scale-out, goo-replicated object store. It is understood that any suitable object storage system can be used. ViPR Object is compatible with file-based storage devices 110, such as EMC Isilon® and VNX®, and NetApp® storage systems.

In operation, a client 102 issues API commands to the object storage system 104. The commands may be specified via HTTP requests according a REST-based API. A command is forwarded to one or more peer storage engines 108 as needed. For example, if the command is an object read command comprising an object key, the request processor 114 (using the partition service 116) determines the location of the object's data and forwards the request as needed. The appropriate storage engines 108 would read the object's data from a storage device 118, and the object data would be returned to the client 102. As another example, if the request comprises an object metadata query as described below with FIG. 2, the request processor 114 may parse, analyze, and execute the query to resolve one or more object keys. In turn, the request processor 114 issues object read commands to the local storage controller 118 and/or issues object read commands to peer nodes 108 containing the resolved object keys. In turn, the request processor aggregates the read object data/metadata and returns it to the client 102.

Figure 2:
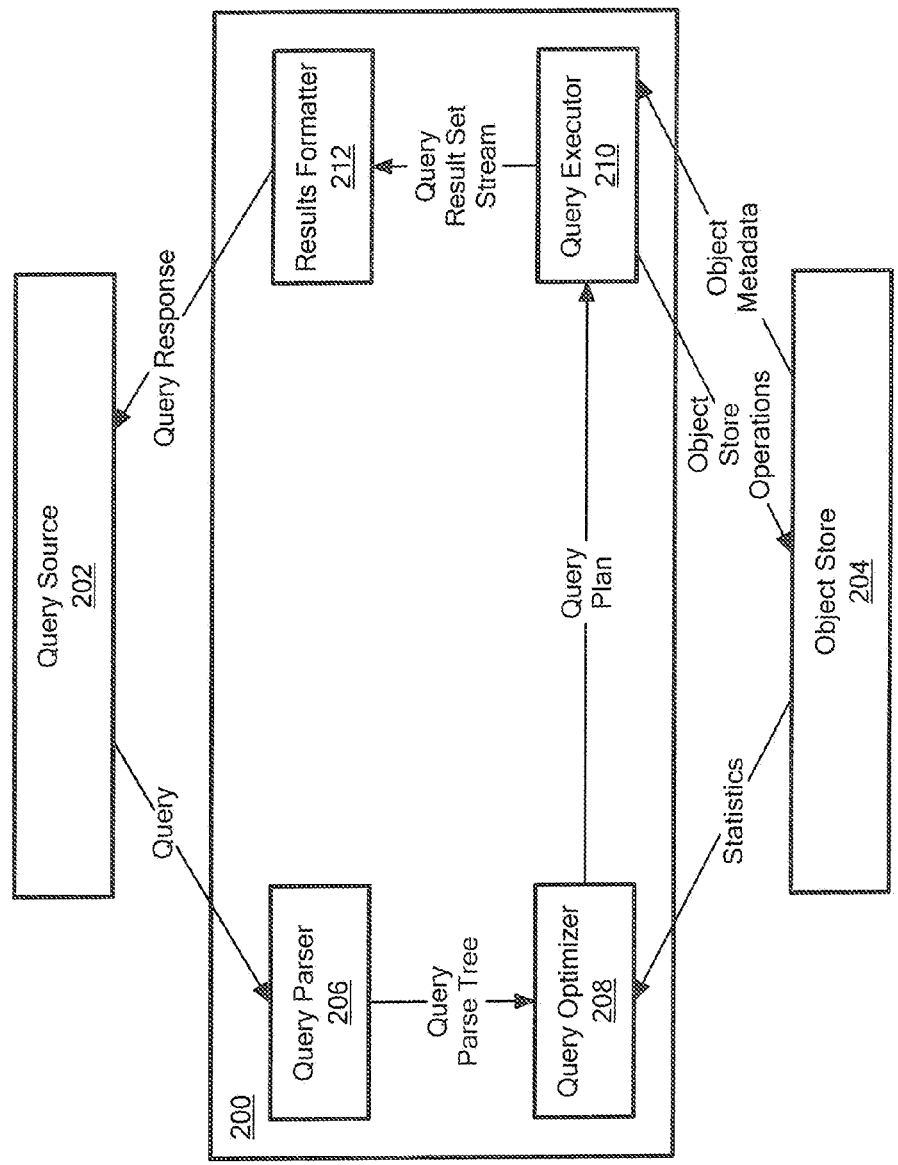
FIG. 2 is a block diagram of an illustrative object query service that could form part of the object storage system of FIG. 1.

Referring to FIG. 2, an illustrative object query service 200 receives object metadata queries (or more simply "queries") from a query source 202, processes the query, and issues corresponding operations to an object store 204. The illustrative object query service (or more simply "query service") 200 includes a query parser 206, a query optimizer 208, a query executor 210, and a results formatter 212, operatively coupled as shown.

In various embodiments, the query service 200 forms a part of the object storage system 104 of FIG. 1. More particularly, the query service 200 could form part of a request processor 114. Accordingly, the object store 204 may include the partition service 116, storage controller 118, and/or storage devices 110; and the query source 202 may correspond to a protocol adapter 112. In other embodiments, the query service 200 is provided separately from the query service 200 as an intermediate layer between clients 102 and the object storage system 104 (i.e., the object store 204 would correspond to the object storage system 104). Thus, the object store 204 may correspond to entire object storage system 104, and the query source 202 may correspond to a client 102.

The query parser 206 receives an object metadata query (or more simply a "query") from the query source 202 and parses the query to generate a query parse tree. In certain embodiments, a query can be posed using a REST-based API, wherein the query is specified within a Hypertext Transfer Protocol (HTTP) request body or header. In some embodiments, a protocol adapter 112 (FIG. 1) extracts the query from the HTTP request. Thus, it will be appreciated that existing REST-based APIs, such as S3 and Swift, can be readily extended to support the various types of object metadata queries described herein. In certain embodiments, a protocol adapter 112 (FIG. 1) implements a programming language-based API and, thus, queries can be posed using an application, such as a command line shell.

An object metadata query can be expressed in a high-level query language modeled on Structured Query Language (SQL). The high-level language, referred to herein as the Object System Query Language (OSQL), is a predicate-based query capability to allow clients to declaratively specify what subset of the objects they are interested in retrieving, without having to specify how those objects are retrieved from the object store 204.

TABLE 1 shows the syntax of OSQL, according to some embodiments. As with SQL, ordering is assumed to be ascending ("ASC") unless explicitly specified as descending ("DESC").

TABLE 1

OSQL Syntax

SELECT(* | metadataKeyName (AS aliasName)? [, metadataKeyName (AS aliasName)?]*
  (FROM bucketName (AS bucketAlias)? )?
  (WHERE queryExpression)?
  (ORDER BY metadataKeyName (ASC | DESC)? [, metadataKeyName (ASC | DESC)?]*])?

TABLE 2 illustrates an OSQL query posed using a REST-based API. In this example, the bucket id ("Employee") and tenant id ("OrgTenant") are specified within a POST URL, and the query is included within the POST body. Alternatively, the bucket id could be specified using a "FROM" clause. The illustrative query of TABLE 2 declares that the result set should include the object id, along with the "name," "city," and "age" metadata properties for employees older than 25. The query also declares that the result set should be sorted by "city."

TABLE 2

OSQL Query Example

```
POST http://Employee.someNamespace.OrgTenant.org/query
<query>
    SELECT Key AS ObjectID, name, city, age
    WHERE age > 25
    ORDER BY city
</query>
```

The query parser 206 can use conventional query parsing techniques to parse an object metadata query into a query parse tree. Those skilled in the art will understand how to adapt existing SQL parsers to parse and/or validate OSQL queries based on the above syntax descriptions. For syntactically correct queries, the result of the query parsing is a query parse tree that is passed to the query optimizer 208.

The query optimizer 208 determines the most efficient way to evaluate the query against objects in a specified bucket to generate the result set. The query optimizer 208 generates one or more query plans based on the query parse tree and evaluates those query plans according to a cost model, to select a plan to be executed. It will be appreciated that, because OSQL is a declarative language (i.e., clients specify what is to be queried but not how), the query optimizer 208 has freedom to consider query plans. This allows the query service 200 to select the "best" approach for translating the query into a set of steps that can be executed against the object store 204.

In some embodiments, the query optimizer 208 uses a four-part approach: (1) generate an initial "logical" query plan that reflects the semantics of the query (this step may be performed by the query parser 206, as described above); (2) use relational algebra rules to generate one or more logical query plans that represent semantically equivalent approaches to resolving the query; (3) use transformation rules to generate one or more "physical" query plans for each candidate logical query plan; and (4) evaluate the physical query plans based on a cost model to select the least cost alternative, which is submitted to the query executor 210 for execution.

As used herein, the term "logical query plan" refers to a representation of a query that satisfies the query's semantics without dictating how the query is executed. In contrast, a "physical" query plan is a query representation that specifies how the query should be executed. A logical query plan includes logical operators that do not necessarily correspond to processing performed by the query service 200 or the object storage 204 (referred to herein as "logical operators"), whereas a physical query plan includes operators that do correspond to processing performed by the query executor 210 and/or the object store 204 (sometimes referred to as "physical operations"). Although any suitable logical operators can be used, non-limiting examples include "Retrieve objects from bucket," "Filter," "Project," and "Sort." In various embodiments, the query service 200 uses tree representations for logical and/or physical query plans. In such representations, each node generally corresponds to a specified logical/physical operator.

Figure 3:
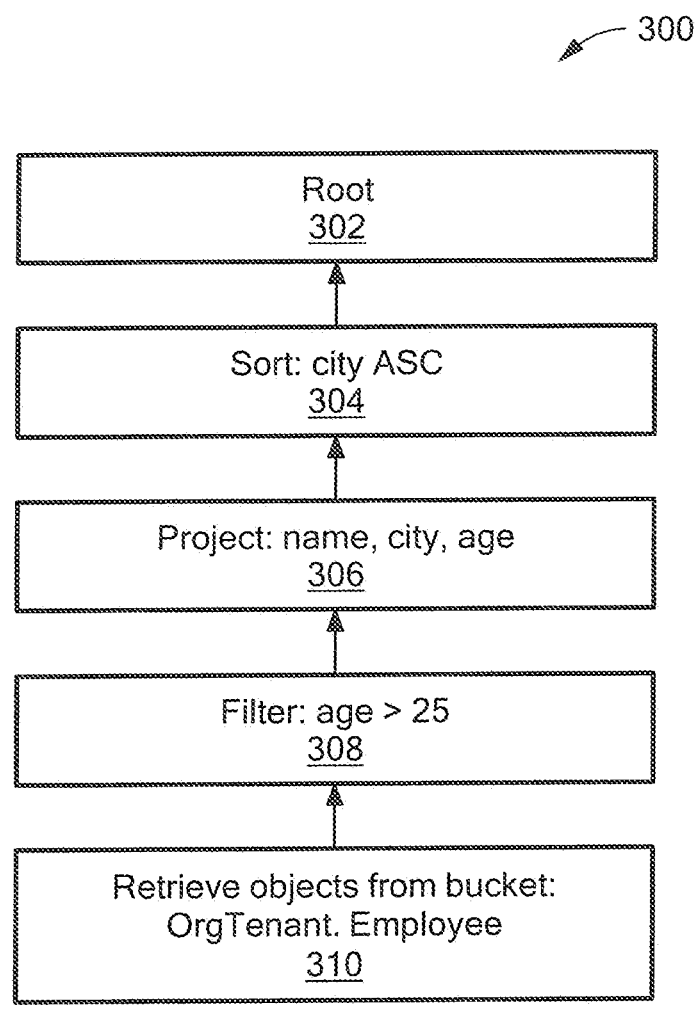
FIG. 3 is a diagram of an illustrative logical query plan.

An initial logical query plan can be derived from the query parse tree using any suitable strategy. One strategy for forming the initial logical query plan is illustrated in FIG. 3, which shows a logical query plan 200 corresponding to the OSQL query of TABLE 2. First, the tree representation 300 is initialized with root node 302. Next, a "Sort" operator node 304 is added based on information within the "ORDER" clause, if present. Next, a "Project" operator node 306 is added based on projection information within the "SELECT" clause. Next, a "Filter" operator node 308 is added based on predicate information within the "WHERE" clause. Finally, a leaf node 310 is added using tenant/bucket information within the "FROM" clause (or using tenant/bucket information within the URL).

As the initial query plan is being formed, optimization can occur based on applying predicate logic rules to simplify and eliminate redundancy that may appear in the query. Existing heuristics and rules can be applied, allowing the query optimizer 208 to consider optimizations by rearranging the operators in a way that preserves query semantics.

The initial logical plan can serve as the basis for generating alternative logical query plans that also satisfy the semantics of the query submitted by the client. Any techniques known in the art, such as relational algebra transformation rules, may be used to generate alternative logical query plans. For example, referring to FIG. 3, alternative logical query plans could be derived from the initial logical query plan 300 by rearranging some of the steps, such as by swapping nodes 304 and 306 to perform the sort operation before the project operation. The initial and alterative logical query plans are collectively referred as the "candidate logical query plans."

The candidate logical query plans can be translated into physical query plans by mapping logical operators to "physical" operators defined within the query executor 210 and/or object store 204. In certain embodiments, the available physical operators are those shown in TABLE 3.

The query optimizer 208 uses any suitable strategy to transform a logical query plan into one or more physical query plans. For example, the query optimizer 208 can apply a set of transformation rules to the logical operators. In certain embodiments, the query optimizer 208 uses the "Strategy" software design pattern, allowing multiple strategies to be evaluated.

TABLE 3

| Physical Operator | Description | Implementation Example |
| --- | --- | --- |
| Bucket scan | Retrieve all metadata for all objects in a bucket | This operation can be implemented by issuing a PREFIX-GET on the primary index using the prefix "<tenant id>,<bucket id>" and then retrieving the resulting list of object metadata from storage devices. |
| Object retrieval | Retrieve all metadata for a single object by its object key | This operation can be implemented by issuing a GET operation on the primary index to determine the object location, and then retrieving the object's metadata using that location |
| Predicate evaluation | Evaluate a given predicate against a stream of object metadata | Any suitable comparison routines can be used, such as string comparison routines and numeric comparators |
| Project | Reduce a stream of object metadata to a given set of metadata keys. In this context, metadata may include object ids. | Any suitable mapping technique can be used |
| Sort | Sort a stream of object metadata using one or more given metadata keys | Any suitable sorting technique can be used, such as Quicksort with an alphanumeric comparator |

Figure 4:
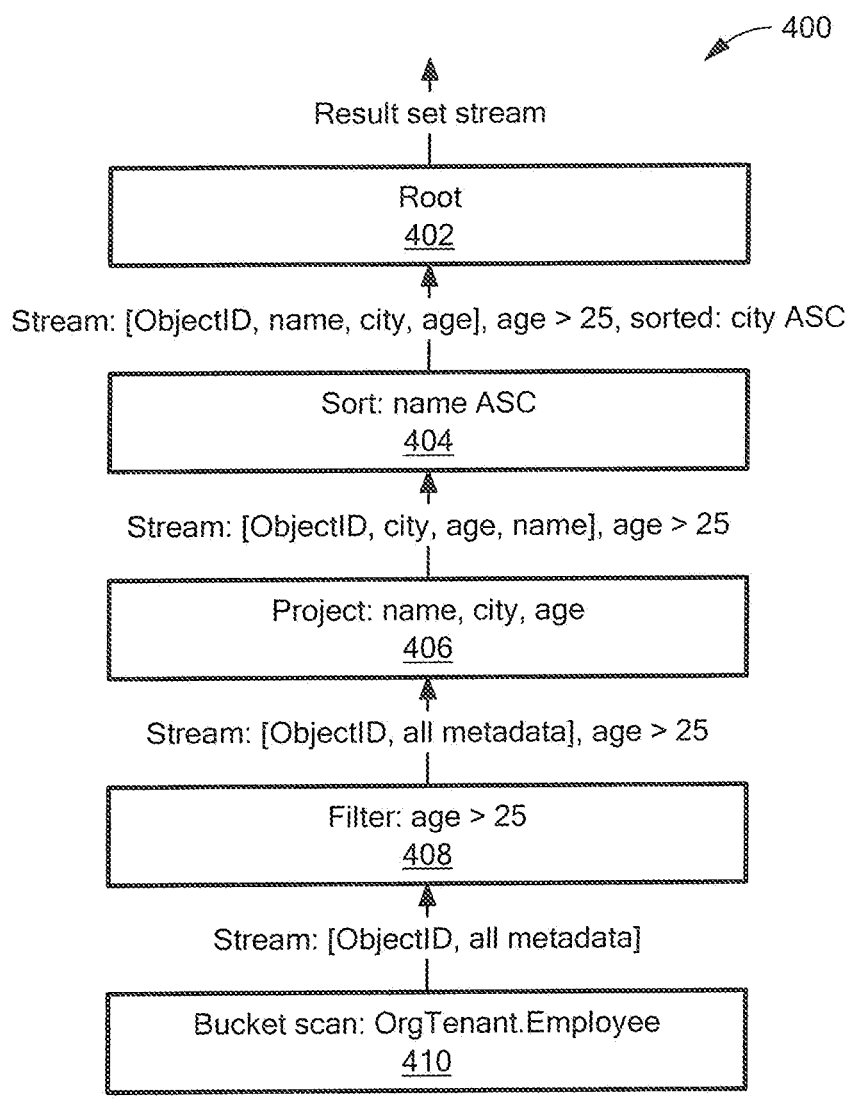
FIG. 4 is a diagram of an illustrative physical query plan corresponding to the logical query plan of FIG. 3.

As an example, FIG. 4 illustrates one possible physical query plan 400 that can be derived from the logical query plan 300 of FIG. 3. The physical query plan 400 includes a root node 402 and physical operator nodes 404-410. In this example, there is a one-to-one correspondence between logical and physical operators, such that nodes 304, 306, 308, and 310 of FIG. 3 correspond to nodes 404, 406, 408, and 410 of FIG. 4, respectively. However, the query optimizer 208 could choose to transform a single logical operator into multiple physical operators, or to transform multiple logical operators into a single physical operator.

The candidate physical query plans, generated for all query plans, are evaluated based on a cost model to determine the least cost (or "best") alternative. A physical query plan can be associated with a cost, which estimates of the time and/or processing resources that may be required to execute that plan. Although the costs are only estimates that do not necessarily reflect the reality of executing the query against the real data in the bucket, utilizing a cost model allows the query optimizer 208 to perform a "best effort" comparison of different plans.

To cost a physical query plan, each node is assigned a cost based on its corresponding physical operation, wherein the cost of the query plan's root node is the aggregate cost of the entire query plan. To cost a physical operation, the query optimizer 208 can use a combination of heuristics along with statistical/historical information. For example, the object store 204 could maintain statistics about the number of objects the bucket; the average object metadata size; the number of blocks required to store the bucket; the blocking factor of the bucket (i.e., the number of object metadata entries that fit into one block); the number of distinctive metadata keys; the number of distinctive metadata values for a given key; the minimum and maximum possible values for a given metadata key; the selectivity of a metadata key, which is the fraction of objects satisfying an equality condition on the metadata key; and the selection cardinality of a given metadata key, which is the average number of objects whose metadata satisfies an equality condition on that key. Any suitable combination of these various statistics could be used to estimate a cost for a given physical operation.

Based upon the cost model evaluation, a physical query plan is selected and submitted to query executor 210 for evaluation. In various embodiments, the plan with the lowest estimated cost is selected. It will be understood that the set of alternative query plans could be quite large and, thus, generating and evaluating all alternative plans can be cost prohibitive. Accordingly, in some embodiments, the query optimizer 208 balances the cost (in time and resources) of determining a "best" query plan versus the savings (in time and resources) of executing the "best" plan compared to a plan that may initially be considered less efficient.

The query executor 210 traverses the selected physical query plan from the leaf nodes up to the root node, generating intermediate results for inner nodes (i.e., non-leaf, non-root nodes). The final result set of the query is generated by evaluating the root node of the selected query plan. In some embodiments, the results of executing a node is a stream of tuples, wherein each tuple includes an object id and/or object metadata for a given object. For example, if a node includes predicate evaluation (e.g., "Filter"), the output of the node is a stream of tuples for which the predicate evaluated to true. Thus, using pipelining, node execution includes consuming an input stream of tuples and evaluating those tuples in some fashion to produce an output stream. Certain operations (e.g., predicate evaluation and project) can commence without having access to the entire input stream and, thus, pipelining techniques known in the art can be applied thereto. Other operations, such as sort, require access to the entire input stream before processing can begin.

In some embodiments, the query executor 210 performs pagination. The pagination parameters can be explicitly specified by a client, or could be defaults within the object storage system. For example, following the S3 API, a client could specify "max-keys" and "marker" parameters within certain REST operations, which specify that maximum number of results to be returned and an lexicographical starting point for returned object ids, respectively. Using these parameters, it will be appreciated that a client can iteratively retrieve a large result set in relatively small batches.

As an example of query executor 210 processing, consider the illustrative physical query plan of FIG. 4 (corresponding to the query of TABLE 2). The query executor 210 begins by processing leaf node 410. If there were multiple leaf nodes, the query executor 210 could process those in parallel using any suitable parallel computing techniques known in the art.

At node 410, the query executor 210 performs a bucket scan on bucket id "Employee" associated with tenant id "OrgTenant." More specifically, the query executor 208 requests a bucket scan from the object store 204, which performs the bucket scan implementation described in TABLE 3. As output, the node 410 produces a stream of tuples [Objectid, all metadata], where "all metadata" corresponds to the list of all stored metadata for an object.

Next, the query executor 210 processes node 408, using node 410's output stream as the input stream. At node 408, the query executor 210 filters the input stream such that only objects having an "age" metadata property with a value greater than 25 are included in its output stream. Next, at node 406, the query executor 208 narrows (i.e., "projects") the tuples to include only [Objectid, name, city and age]. It should be appreciated that the processing of nodes 408 and 406 can occur in parallel using parallel processing and pipelining techniques. Next, at node 404, the query executor 210 performs a sort, producing an output stream sorted by the "city" metadata property in ascending order.

Next, the query executor 210 performs processing associated with the root node 402. For example, if explicitly/default pagination parameters are given, the query executor 210 could apply pagination by skipping input topics until the "marker" object id is found and limiting the output stream to "max-keys" topics. The output of the root node 402 is referred to herein as the "result set stream."

The results formatter 212 prepares the result set stream into a suitable format for responding to the client 102. In some embodiments, the results formatter 212 generates a "list bucket response," which is a specified in the S3 API. For example, TABLE 4 shows portions of an illustrative XML-encoded list bucket response corresponding to the query of TABLE 2. It will be appreciated that the response is the same as a standard list bucket response, but includes only a subset of objects in the bucket that satisfy the query. Thus, the client can specify the response format (XML in TABLE 2, although JSON, CSV, plain text, etc, could also be specified) using the Content-Type HTTP request header, can authenticate itself using standard user authentication headers, can control pagination using the "max-keys" and "marker" parameters, etc. For each object matching the query, the response includes an object id and a list of projected attributes. In some embodiments, the response could include a URL for each object, indicating the location from which the object data can be retrieved (i.e., "downloaded") by the client.

TABLE 4

List Bucket Response Example

```
<ListBucketResult ...>
    <Name>Employee</Name>
    <Prefix/>
    <Marker/>
    <MaxKeys>1000</MaxKeys>
    <IsTruncated>false</IsTruncated>
    <Contents>
        <ObjectID>Emp-6654-image.jpg</ObjectID>
        <name>Bob</name>
        <city>Seattle</city>
        <age>26</age>
    </Contents>
    <Contents>
        <ObjectID>Emp-2290-image.jpg</ObjectId>
        <name>Alice</name >
        <city>Seattle</city>
        <age>29</age>
    </Contents>:
    ...
</ListBucketResult>
```

It will be appreciated that with query planning, secondary indexing, and other optimization techniques, object retrieval using the systems and techniques disclosed herein may be far more efficient than a simple list of all objects in a bucket and predicate evaluation against each object. Moreover, because the query language embodiments disclosed herein (i.e., "OSQL") are declarative, meaning that the client specifies what is to be queried but not how, the systems and techniques can be improved over time without change to clients.

Figure 5:
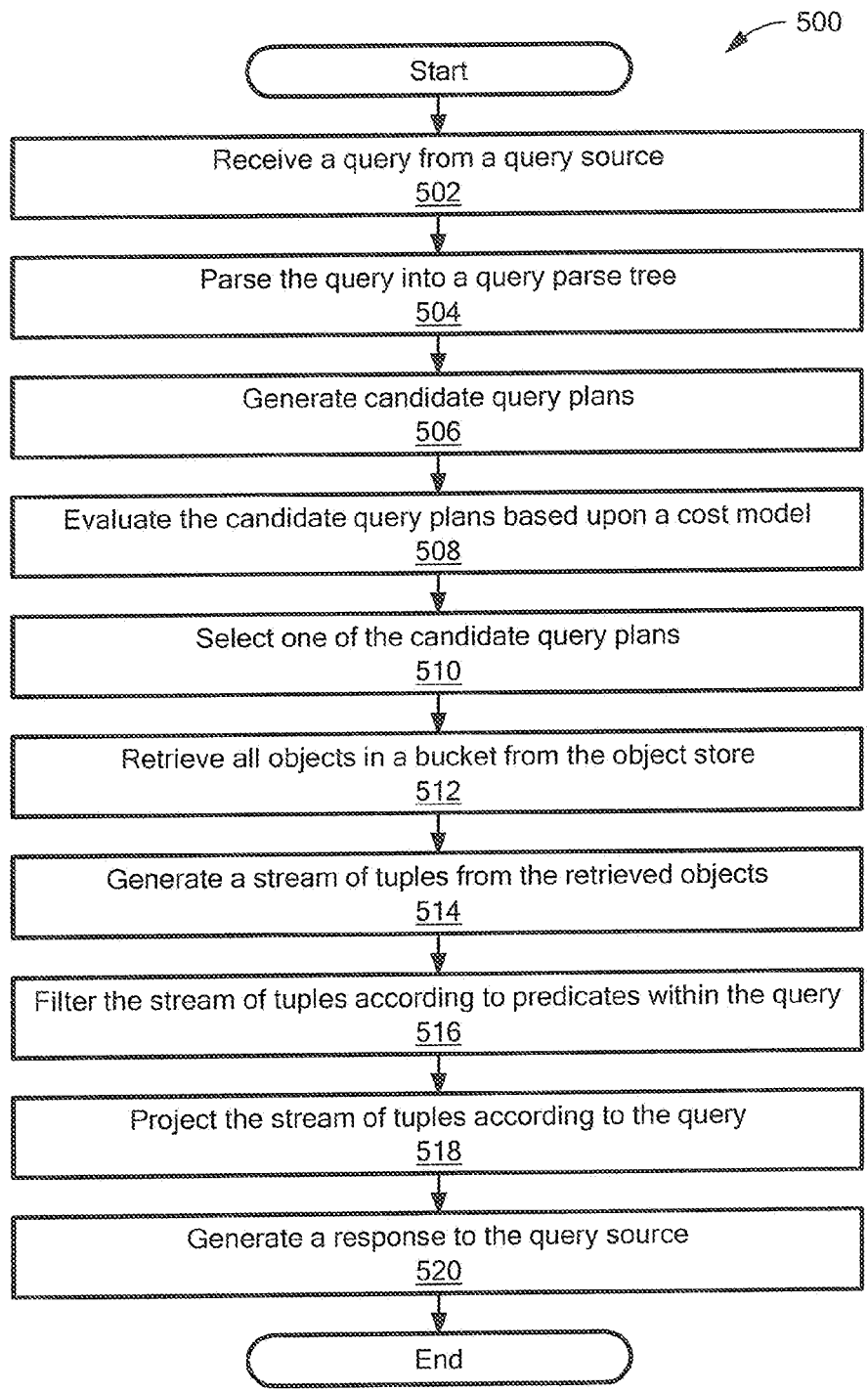
FIG. 5 is a flowchart illustrating a method for use with the systems of FIGS. 1 and 2.

FIG. 5 is a flowchart corresponding to the below contemplated technique which would be implemented in the object storage system 104 (FIG. 1) and/or the query service 200 (FIG. 2). Rectangular elements (typified by element 502), herein denoted "processing blocks," represent computer software instructions or groups of instructions. Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the concepts, structures, and techniques sought to be protected herein. Thus, unless otherwise stated the blocks described below are unordered meaning that, when possible, the functions represented by the blocks can be performed in any convenient or desirable order.

At block 502, a query is received from a query source (e.g., a query source 202 of FIG. 2). At block 504, the query is parsed into a query parse tree and, at block 506, one or more candidate query plans are generated based upon the query parse tree. The candidate query plans may physical query plans derived from logical query plans. At block 508, the candidate query plans are evaluated based upon a cost model and, at block 510, one of the candidate query plans is selected for execution. At block 512, a bucket scan is performed against the object store to retrieve a list of object ids and corresponding object metadata in a bucket. At block 514, a stream of tuples is generated using the object ids and metadata. In some embodiments, the selected query plan is a tree representation, wherein nodes of the tree representation correspond to operations. The query plan can be executed by traversing the nodes of the tree representation and executing the corresponding operations. For example, at block 516, the stream of tuples may be filtered according to predicates within the query; and, at block 518, the topics may be projected according to a list of metadata keys within the query. At block 520, a response to the query source formed based upon the processed stream of tuples.

Figure 6:
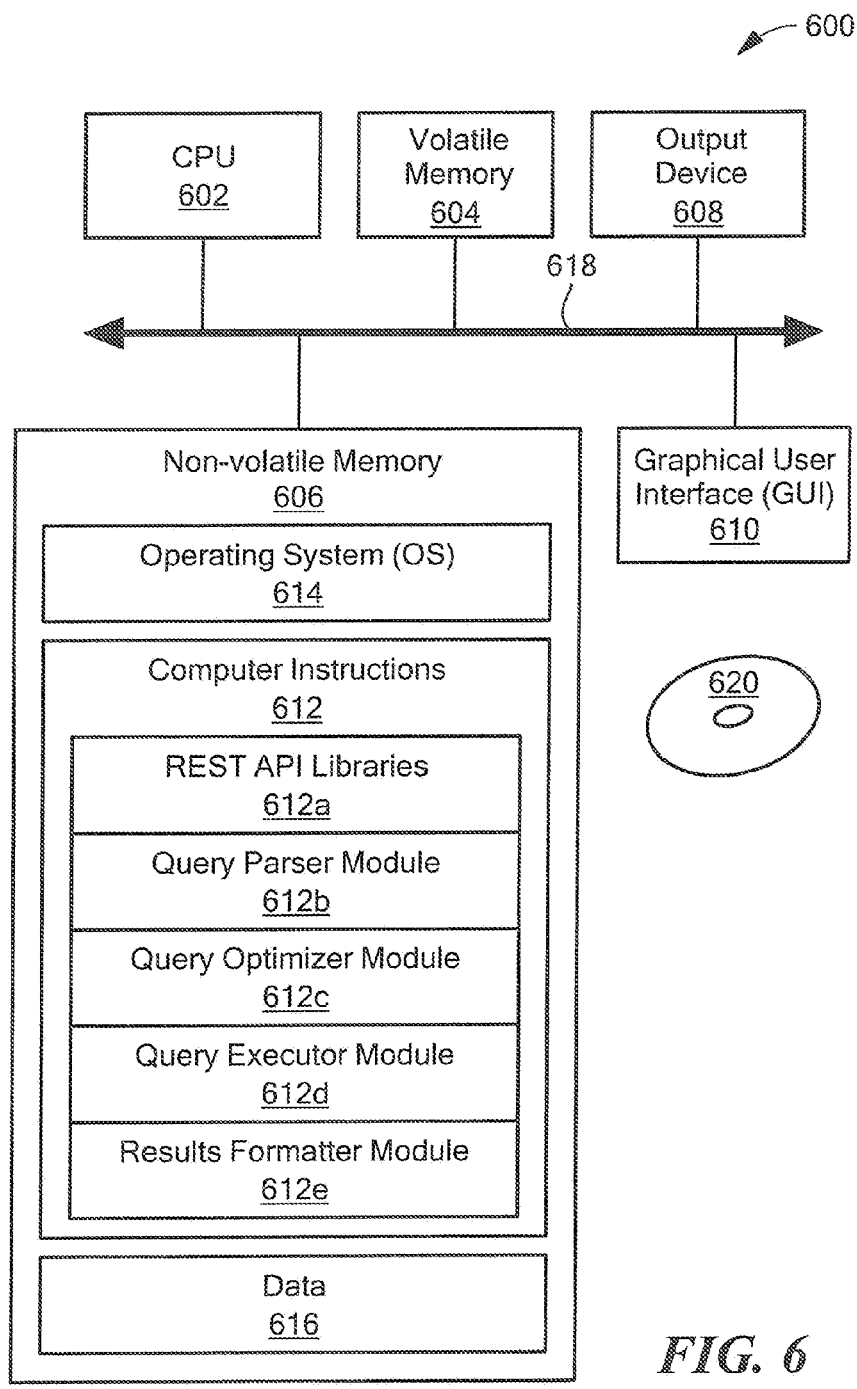
FIG. 6 is a schematic representation of an illustrative computer for use with the systems and methods of FIGS. 1, 2, and 5.

FIG. 6 shows an illustrative compute or other processing device 600 that can perform at least part of the processing described herein. The computer 600 includes a processor 602, a volatile memory 604, a non-volatile memory 606 (e.g., hard disk), an output device 608 and a graphical user interface (GUI) 610 (e.g., a mouse, a keyboard, a display, for example), each of which is coupled together by a bus 618. The non-volatile memory 606 stores computer instructions 612, an operating system 614, and data 616. In one example, the computer instructions 612 are executed by the processor 602 out of volatile memory 604. In one embodiment, an article 620 comprises non-transitory computer-readable instructions.

In certain embodiments, the computer instructions 612 include one or more REST API libraries 612a, query parser module instructions 612b, query optimizer module instructions 612c, query executor module instructions 612d, and/or results formatter module instructions 612e.

Processing may be implemented in hardware, software, or a combination of the two. In embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that that scope of protection sought herein should not be limited to the described embodiments but rather should be limited only by the spirit and scope of the following claims.

What is claimed is:

1. A system comprising:
   an object store to store a plurality of objects and corresponding object metadata within storage devices, each of the objects having an object id and being associated with a bucket;
   a query parser to receive a query from a query source and to parse the received query into a query parse tree, the received query specifying a bucket id and a tenant id;
   a query optimizer to generate candidate query plans, to evaluate the candidate query plans based upon a cost model, and to select one of the candidate query plans based upon the cost model evaluation, each of the candidate query plans being semantically equivalent to the received query;
   a query executor to retrieve ones of the object ids and the object metadata from the object store using the bucket id and the tenant id specified by the received query, to generate a stream of tuples from the retrieved object ids and the object metadata, to filter the stream of tuples according to predicates within the received query, and to project the stream of tuples according to a list of metadata keys within the received query to generate a query result set stream; and
   a query formatter to generate a response to the query source based upon the query result set stream.

2. The system of claim 1 wherein the query optimizer generates at least one logical query plan according to the received query, and generates a plurality of physical query plans according to the logical query plan, wherein the selected query plan corresponds to one of the plurality of physical query plans.

3. The system of claim 2 wherein the selected query plan comprises a tree representation, wherein nodes of the tree representation correspond to operations, wherein the query executor executes the selected query plan by traversing the nodes of the tree representation and executing the corresponding operations.

4. The system of claim 1 wherein the received query includes a select clause comprising the list of metadata keys.

5. The system of claim 4 wherein the received query includes a where clause comprising the predicates.

6. The system of claim 5 wherein the received query comprises an order clause comprising a sort criteria, wherein the query executor further sorts the stream of tuples according to the sort criteria.

7. The system of claim 1 wherein the received query is included within REST API request.

8. The system of claim 1 wherein the object store comprises a distributed key-value store to map object keys to storage locations within the storage devices.

9. A method comprising:
   receiving a query from a query source, the received query including a bucket id identifying a bucket within an object store;
   parsing the received query into a query parse tree;
   generating candidate query plans, each of the candidate query plans being semantically equivalent to the received query;
   evaluating the candidate query plans based upon a cost model, wherein the cost model considers statistical information associated with the bucket including a number of objects stored in the bucket;
   selecting one of candidate query plans based upon the cost model evaluation;
   retrieving a plurality of object ids and corresponding object metadata from the object store using the bucket id;
   generating a stream of tuples from the retrieved object ids and object metadata;
   filtering the stream of tuples according to predicates within the received query;
   projecting the stream of tuples according to a list of metadata keys within the received query to generate a query result set stream; and
   generating a response to the query source based upon the query result set stream.

10. The method of claim 9 wherein generating candidate query plans includes:
    generating at least one logical query plans according to the received query; and
    generating a plurality of physical query plans according to the logical query plan, wherein the selected query plan corresponds to one of the plurality of physical query plans.

11. The method of claim 10 wherein generating a plurality of physical query plans comprises generating a tree representation, wherein nodes of the tree representation correspond to operations, the method further comprising traversing the nodes of the tree representation and executing the corresponding operations.

12. The method of claim 9 wherein the received query includes a select clause comprising the list of metadata keys.

13. The method of claim 12 wherein the received query includes a where clause comprising the predicates.

14. The method of claim 13 wherein the received query comprises an order clause comprising a sort criteria, wherein the method further comprises sorting the stream of tuples according to the sort criteria.

15. The method of claim 9 wherein receiving a query from a query source comprises receiving a REST API request.

16. The method of claim 9 wherein the object store comprises a distributed key-value store to map object keys to storage locations within the storage devices, wherein retrieving a plurality of object ids from the object store comprises issuing a command to the distributed key-value store.

17. A system comprising:
- an object store means for storing a plurality of objects and corresponding object metadata within storage devices, each of the objects having an object id and being associated with a bucket;
- a query parse means for receiving a query from a query source and parsing the received query into a query parse tree, the received query specifying a bucket id;
- a query optimization means for generating a candidate query plans, evaluating the candidate query plans based upon a cost model, and selecting one of the candidate query plans based upon the cost model evaluation, each of the candidate query plans being semantically equivalent to the received query;
- a query execution means for retrieving object ids and object metadata by performing a bucket scan operation on the object store using the bucket id specified by the received query, generating tuples from the retrieved object ids and object metadata, filtering the stream of tuples according to predicates within the received query, and projecting the stream of tuples according to a list of metadata keys within the received query to generate a query result set stream, wherein the bucket scan operation is an operation provided by the object store for retrieving metadata for all objects in a bucket; and
- a query formatting means for generating a response to the query source based upon the query result set stream.

18. The system of claim 17 wherein the query optimization means generates at least one logical query plan according to the received query, and generates a plurality of physical query plans according to the logical query plan, wherein the selected query plan corresponds to one of the plurality of physical query plans.

19. The system of claim 18 wherein the selected query plan comprises a tree representation, wherein nodes of the tree representation correspond to operations, wherein the query execution means executes the selected query plan by traversing the nodes of the tree representation and executing the corresponding operations.

20. The method of claim 9 wherein each of the plurality of objects stored within the object store is uniquely identified by an object key comprising a tenant id, a bucket id, and an object id.

* * * * *